United States Patent
Bernards

(10) Patent No.: US 9,310,020 B1
(45) Date of Patent: Apr. 12, 2016

(54) MOBILE DEVICE MOUNTING SYSTEM AND METHOD

(71) Applicant: Douglas B. Bernards, Valencia, CA (US)

(72) Inventor: Douglas B. Bernards, Valencia, CA (US)

(*) Notice: Subject to any disclaimer, the term of this patent is extended or adjusted under 35 U.S.C. 154(b) by 0 days.

(21) Appl. No.: 14/484,271

(22) Filed: Sep. 12, 2014

Related U.S. Application Data

(60) Provisional application No. 61/879,064, filed on Sep. 17, 2013.

(51) Int. Cl.
*A47B 91/00* (2006.01)
*F16M 11/04* (2006.01)

(52) U.S. Cl.
CPC .................................. *F16M 11/041* (2013.01)

(58) Field of Classification Search
CPC ..................................................... F16M 11/041
See application file for complete search history.

(56) References Cited

U.S. PATENT DOCUMENTS

| | | | |
|---|---|---|---|
| 5,253,292 A | 10/1993 | Fluder et al. | |
| 5,436,792 A | 7/1995 | Leman et al. | |
| 5,664,228 A | 9/1997 | Mital | |
| 5,737,183 A | 4/1998 | Kobayashi et al. | |
| 5,850,954 A | 12/1998 | Dong-Joo | |
| 5,948,047 A | 9/1999 | Jenkins et al. | |
| 5,996,956 A | 12/1999 | Shawver | |
| 6,231,371 B1 | 5/2001 | Helot | |
| 6,473,302 B1 | 10/2002 | Korycan et al. | |
| 6,538,880 B1 | 3/2003 | Kamijo et al. | |
| 6,646,866 B2 | 11/2003 | Kao | |
| 6,697,251 B1 | 2/2004 | Aisenberg | |
| 6,788,528 B2 | 9/2004 | Enners et al. | |
| 7,040,697 B1 * | 5/2006 | Tuccinardi | B60R 11/0235 297/188.04 |
| 7,197,584 B2 | 3/2007 | Huber et al. | |
| 7,269,002 B1 | 9/2007 | Turner et al. | |
| D582,149 S | 12/2008 | Tan | |
| D592,189 S | 5/2009 | Corsini et al. | |
| D606,305 S | 12/2009 | Lee et al. | |
| 7,907,394 B2 | 3/2011 | Richardson | |
| D637,596 S | 5/2011 | Akana et al. | |

(Continued)

FOREIGN PATENT DOCUMENTS

| | | |
|---|---|---|
| CN | 201842027 U | 5/2011 |
| EP | 2608493 A1 | 6/2013 |

OTHER PUBLICATIONS

Shoemaker, Natalie, "Dock and More—The Omnio WOW-Keys keyboard gives you a reason to dock your iPhone," PCMAG.com, Jun. 2, 2011.

(Continued)

*Primary Examiner* — Amy Sterling
(74) *Attorney, Agent, or Firm* — David L. Hoffman; Hoffman Patent Group

(57) ABSTRACT

In an embodiment, a mobile device mounting system configured to hold a mobile device having a magnetic edge includes a magnetic support, a rest support, and a receiving section. The rest support is mechanically coupled to the magnetic support and has a first support surface that contacts a first contact surface on a rear side of the mobile device when the mobile device is moved downward to be held by the mobile device mounting system for viewing. The receiving section defines a recessed area configured to receive a part of the mobile device when the mobile device is angled such that the magnetic edge of the mobile device is separated from the magnetic support for user extraction.

6 Claims, 16 Drawing Sheets

(56) References Cited

U.S. PATENT DOCUMENTS

| | | | |
|---|---|---|---|
| D644,229 S | 8/2011 | Corsini et al. | |
| 8,093,486 B2 | 1/2012 | Behringer et al. | |
| D659,139 S | 5/2012 | Gengler | |
| 8,190,222 B2 | 5/2012 | Cheng | |
| 8,203,657 B2 | 6/2012 | Vitito | |
| 8,204,561 B2 | 6/2012 | Mongan et al. | |
| D662,925 S | 7/2012 | Mayberry et al. | |
| 8,238,086 B2 | 8/2012 | Ou | |
| 8,245,842 B2 | 8/2012 | Bau | |
| 8,295,043 B2 | 10/2012 | Tai | |
| RE43,869 E | 12/2012 | Lewandowski et al. | |
| 8,353,083 B2 * | 1/2013 | Wu | G06F 1/1616 16/255 |
| 8,369,082 B2 | 2/2013 | Madonna et al. | |
| 8,379,382 B2 | 2/2013 | Marshall et al. | |
| 8,382,059 B2 | 2/2013 | Le Gette et al. | |
| 8,395,894 B2 | 3/2013 | Richardson et al. | |
| 8,439,191 B1 | 5/2013 | Lu | |
| 8,472,186 B2 | 6/2013 | Probst et al. | |
| 8,488,832 B2 | 7/2013 | Leung | |
| 8,509,865 B1 | 8/2013 | LaColla et al. | |
| 8,531,833 B2 | 9/2013 | Diebel et al. | |
| 8,548,541 B2 | 10/2013 | Rayner | |
| 8,573,394 B2 | 11/2013 | Ahee et al. | |
| D694,742 S | 12/2013 | Pan | |
| 8,619,416 B2 | 12/2013 | Lim | |
| 8,630,088 B2 | 1/2014 | Collopy et al. | |
| 8,638,557 B2 | 1/2014 | Tsai | |
| 8,659,889 B2 | 2/2014 | Dolci et al. | |
| 8,665,045 B2 | 3/2014 | Lauder et al. | |
| 8,675,359 B2 | 3/2014 | Chen | |
| 8,702,055 B2 | 4/2014 | Alemozafar et al. | |
| 8,706,176 B1 | 4/2014 | Jia et al. | |
| 8,708,142 B2 | 4/2014 | Rayner | |
| 8,714,347 B2 | 5/2014 | Mongan et al. | |
| 8,718,731 B1 | 5/2014 | Tang | |
| 8,749,363 B2 | 6/2014 | Masuda et al. | |
| 8,749,963 B2 | 6/2014 | Staats et al. | |
| 8,749,970 B2 | 6/2014 | Petersson | |
| 2003/0041206 A1 | 2/2003 | Dickie | |
| 2003/0137584 A1 | 7/2003 | Norvell et al. | |
| 2004/0080899 A1 | 4/2004 | Hill et al. | |
| 2004/0227372 A1 | 11/2004 | Lavelle et al. | |
| 2005/0185364 A1 | 8/2005 | Bell et al. | |
| 2008/0157574 A1 | 7/2008 | LaRussa | |
| 2008/0225471 A1 | 9/2008 | Takizawa | |
| 2008/0252118 A1 * | 10/2008 | Chang | B60R 11/0235 297/217.3 |
| 2008/0270665 A1 | 10/2008 | Senatori et al. | |
| 2010/0062816 A1 | 3/2010 | Yu | |
| 2010/0072334 A1 | 3/2010 | Le Gette et al. | |
| 2010/0078343 A1 | 4/2010 | Hoellwarth et al. | |
| 2010/0172081 A1 | 7/2010 | Tian et al. | |
| 2011/0222238 A1 | 9/2011 | Staats et al. | |
| 2011/0240830 A1 | 10/2011 | Alemozafar et al. | |
| 2012/0008269 A1 | 1/2012 | Gengler | |
| 2012/0071217 A1 | 3/2012 | Park | |
| 2012/0097831 A1 | 4/2012 | Olukotun et al. | |
| 2012/0104185 A1 | 5/2012 | Carroll | |
| 2012/0162891 A1 | 6/2012 | Tranchina et al. | |
| 2012/0175474 A1 | 7/2012 | Barnard et al. | |
| 2012/0199501 A1 | 8/2012 | Le Gette et al. | |
| 2012/0217257 A1 | 8/2012 | Ting | |
| 2013/0009032 A1 | 1/2013 | Polletta et al. | |
| 2013/0026324 A1 | 1/2013 | Fischer et al. | |
| 2013/0043290 A1 | 2/2013 | Prater et al. | |
| 2013/0119727 A1 | 5/2013 | Lavelle et al. | |
| 2013/0213838 A1 | 8/2013 | Tsai et al. | |
| 2013/0334072 A1 | 12/2013 | Rayner | |

OTHER PUBLICATIONS

Author Unknown, WOW-Keys Top View Photo.
Author Unknown, FiField Fabrications Website, Fifieldfabrications.com, Sep. 12, 2014.

* cited by examiner

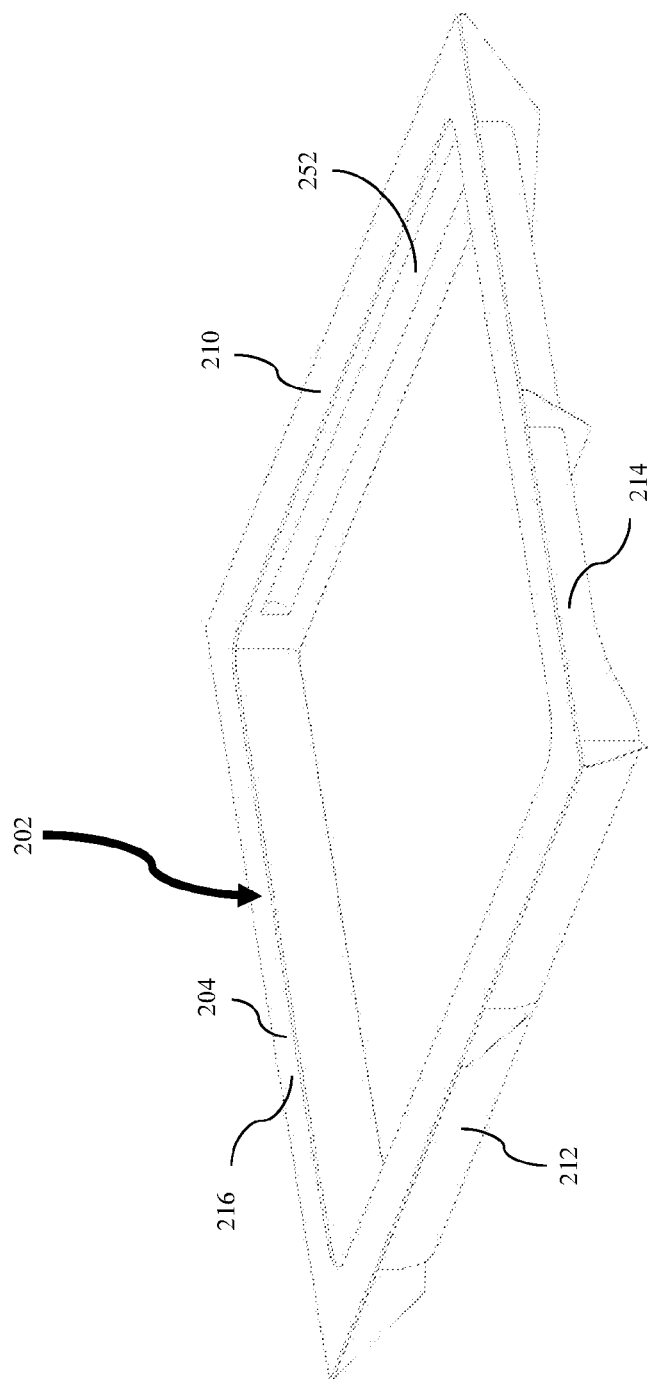
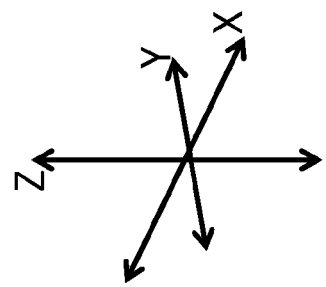
FIG. 3

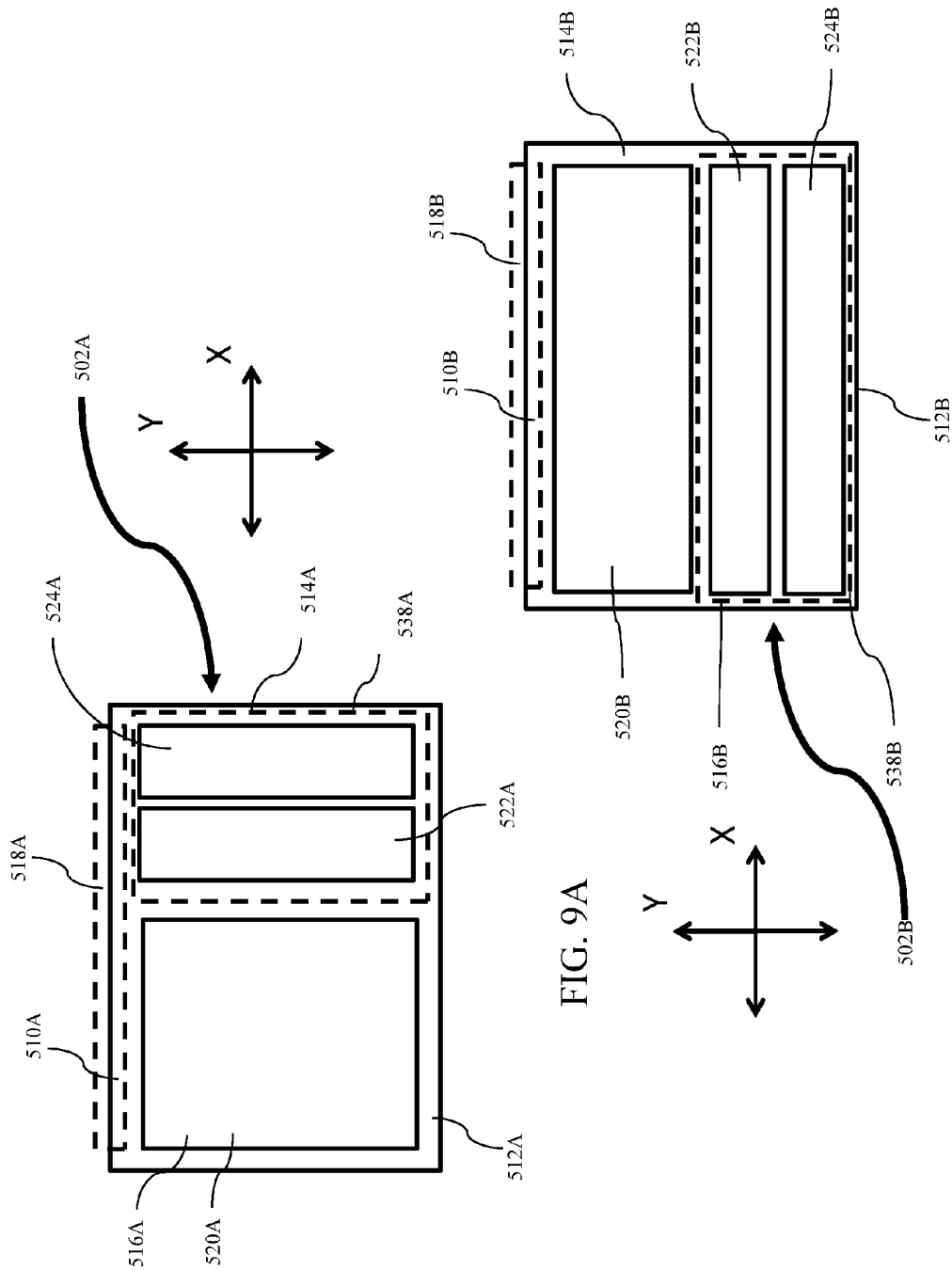

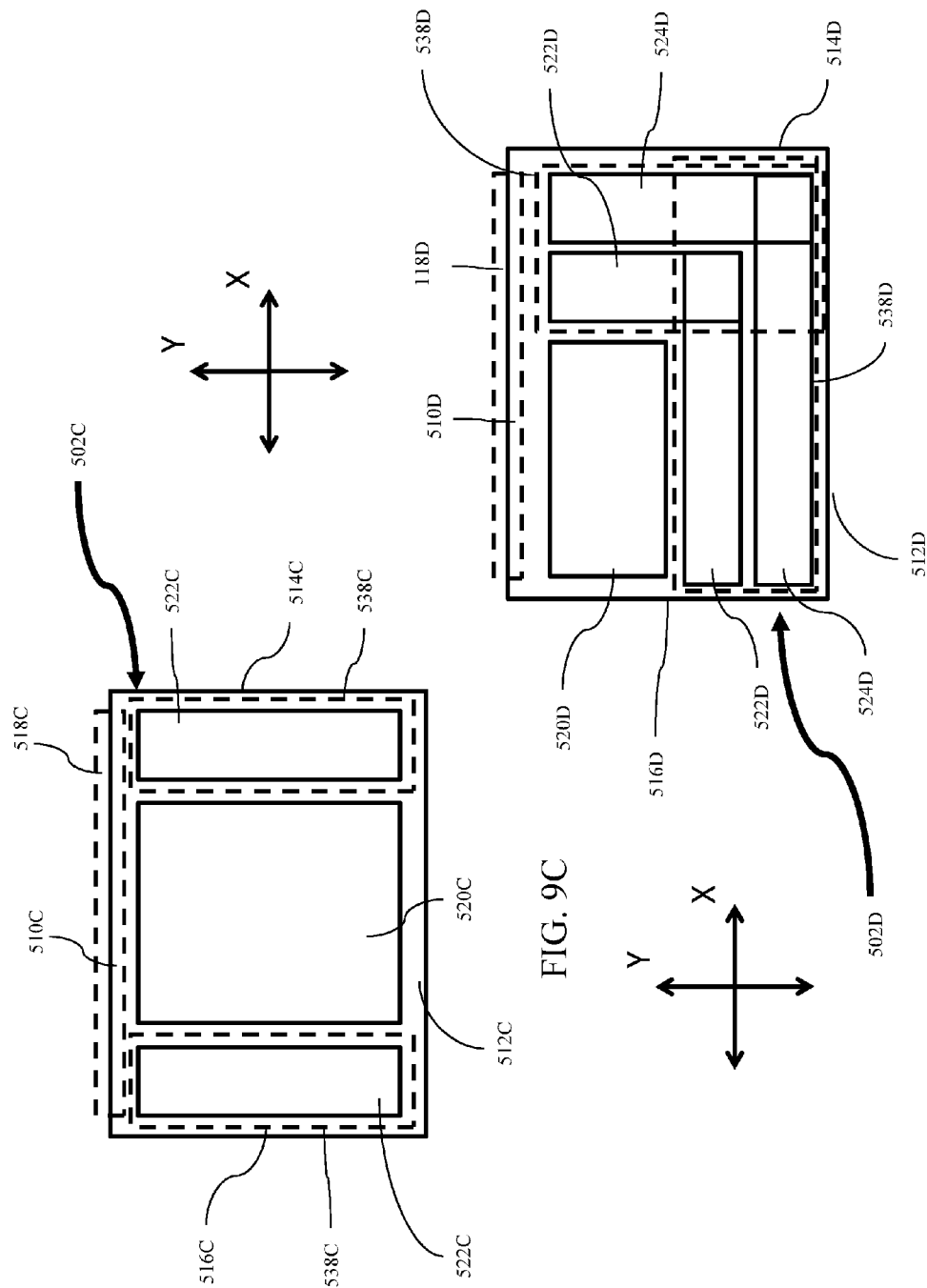

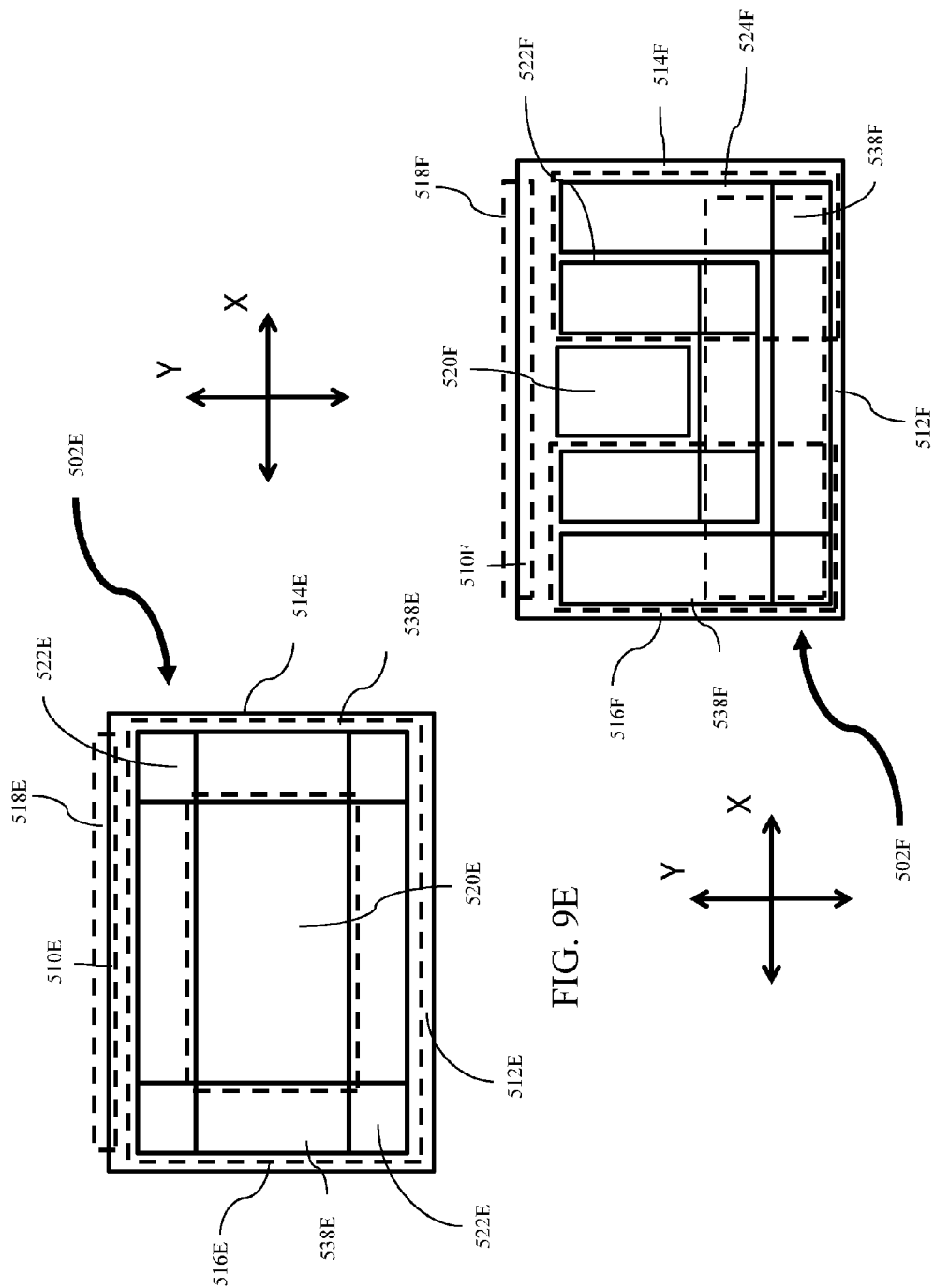

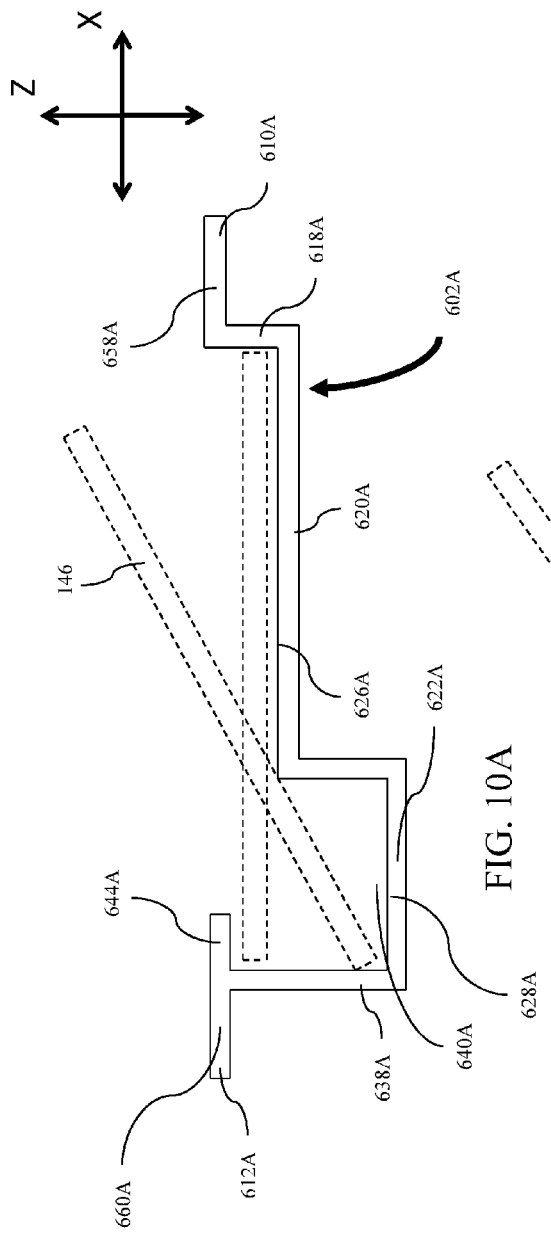
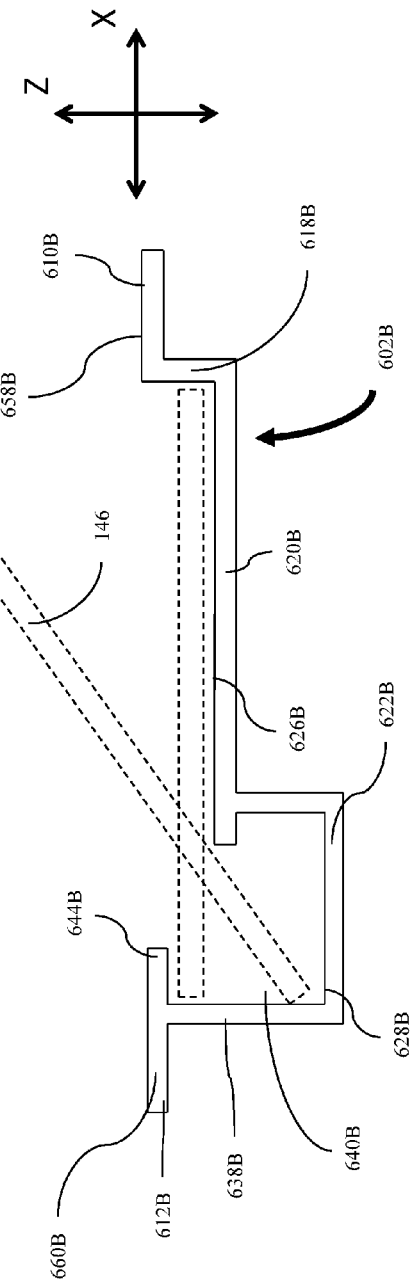
FIG. 10A
FIG. 10B

MOBILE DEVICE MOUNTING SYSTEM AND METHOD

CROSS REFERENCE TO RELATED APPLICATION

This application claims the benefit of U.S. Provisional Application Ser. No. 61/879,064, filed on Sep. 17, 2013, the entirety of which is incorporated herein by reference.

BACKGROUND

1. Technical Field

This invention relates to mounting systems, and more particularly to a mobile device mounting system and method.

2. Description of the Related Art

Conventional systems may require substantial time and effort for a user to mount a mobile device, such as in the dashboard of a vehicle, on a wall, or at another location. For example, a user may be required to use tools to install a cover plate over a mobile device to secure the mobile device in the dashboard. Other conventional systems may require multiple parts to be engaged and assembled together to hold the mobile device in place, which may be difficult for a user to understand and learn how to use. In addition, such conventional systems may involve multiple moving parts, each of which may add to an assembly and manufacturing cost, and which may also create an additional point of failure.

Accordingly, improvements may be made over such conventional systems.

SUMMARY

In an aspect, a mobile device mounting system configured to hold a mobile device, the device preferably having a magnetic edge. The mounting system has a receiving section having a recess for receiving the device. The recess is preferably shaped to correspond or substantially correspond to the size and shape of the mobile device so that the mobile device fits within the recess. The system is adapted for easily inserting, holding and easily removing the mobile device, preferably without any moving parts. The mobile device may be held in the recess of the receiving section preferably by magnets, by friction, or a combination of magnets and friction. The recess is constructed, as explained herein, such that the removal of the mobile device is by simply pressing on or near one edge of the device, eliminating the need for any moving parts, springs and/or other parts that tend to increase the cost of manufacture and assembly and/or tend to fail more easily.

For purposes of explanation, a three axis coordinate system is used to describe relative directions (e.g., a Cartesian coordinate system, or orthogonal X, Y, and Z axes). A first axis may represent an X axis, a second axis may represent a Y axis, and a third axis may represent a Z axis. In various embodiments, the first, second, and third axis may represent other axes.

In the system, there preferably is a magnetic support, a rest support, and the receiving section. The magnetic support extends along a first axis. The rest support is mechanically coupled to the magnetic support and extends away from the magnetic support along a second axis that is perpendicular to the first axis. The rest support has a first support surface that contacts a first contact surface on a rear side of the mobile device when the mobile device is moved downward along a third axis that is perpendicular to the first axis and the second axis to be held by the mobile device mounting system for viewing.

The receiving section is mechanically coupled to the first rest support. The receiving section defines a recessed area relative to the first support surface along the third axis, the recessed area being configured to receive a part of the mobile device when the mobile device is angled such that the magnetic edge of the mobile device is separated from the magnetic support.

The receiving section may include a first rotation support that has a second support surface that contacts a second contact surface on the rear side of the mobile device when the mobile device has been rotated toward the second support surface. The second support surface may be curved such that a part of the second contact surface that is in contact with the second support surface changes as the mobile device is rotated around the first rotation support. The curve of the second support surface may decrease in radius with increasing distance away from the first support surface.

The receiving section may include a second rotation support that is mechanically coupled to the first rotation support. The second rotation support may have a third support surface that contacts a third contact surface on the rear side of the mobile device when the mobile device has been rotated away from the first support surface and the second support surface and towards the third support surface. The third support surface may extend away from the second support surface along the second axis while extending toward a back side of the mobile device mounting system along the third axis.

In another aspect, a method of manufacturing a mobile device mounting system configured to hold a mobile device having a magnetic edge includes forming a magnetic support that extends along a first axis, mechanically coupling a rest support to the magnetic support, and mechanically coupling a receiving section to the first rest support.

The rest support extends away from the magnetic support along a second axis that is perpendicular to the first axis. The rest support has a first support surface that contacts a first contact surface on a rear side of the mobile device when the mobile device is moved downward along a third axis that is perpendicular to the first axis and the second axis to be held by the mobile device mounting system for viewing, and the mobile device's magnetic edge is adjacent to and magnetically engaged with the magnetic support.

The receiving section defines a recessed area relative to the first support surface along the third axis. The recessed area is configured to receive a part of the mobile device when the mobile device is angled such that the magnetic edge of the mobile device is separated from the magnetic support.

In another aspect, a method of operation of a mobile device mounting system includes, using the magnetic support, engaging the magnetic edge of a mobile device. The method further includes, using the first rest support, supporting the mobile device at a first contact surface during use by a user and while the mobile device is being held by the mobile device mounting system. The method also includes, when the user presses on the mobile device at an area that would intersect the receiving section when projected through the mobile device along the third axis, receiving a part of the mobile device when the mobile device is angled such that the magnetic edge of the mobile device is separated from the magnetic support.

The receiving section may include a first rotation support that has a second support surface, and the method may further include, using the second support surface, receiving contact from a second contact surface on the rear side of the mobile device when the mobile device has been rotated toward the second support surface.

The second support surface may be curved such that a part of the second contact surface that is in contact with the second support surface changes as the mobile device is rotated around the first rotation support. The curve of the second support surface may decrease in radius with increasing distance away from the first support surface.

The receiving section may include a second rotation support that is mechanically coupled to the first rotation support, and the second rotation support may have a third support surface. The method may further include, using the third support surface, receiving contact from a third contact surface on the rear side of the mobile device when the mobile device has been rotated away from the first support surface and the second support surface and towards the third support surface.

The third support surface may extend away from the second support surface along the second axis while extending toward a back side of the mobile device mounting system along the third axis.

In a preferred embodiment, the mobile device mounting system enables secure reception and quick ejection, both preferably without any moving parts in the mounting system.

BRIEF DESCRIPTION OF THE DRAWINGS

FIG. 3 is a perspective view of a mobile device mounting system, according to a variation of the first embodiment;

FIGS. 9A-9F illustrate various arrangements of mobile device mounting systems, according to various embodiments;

FIGS. 10A-10F illustrate cross-sectional views of mobile device mounting systems, according to various embodiments;

DESCRIPTION OF EXEMPLARY EMBODIMENTS

Exemplary embodiments of the invention are described in detail below. Note that the following exemplary embodiments do not in any way limit the scope of the invention. Note also that all of the elements described in connection with the following exemplary embodiments should not necessarily be taken as essential elements of the invention.

I. Overview

In various embodiments, the device includes a body configured to magnetically hold and/or suspend a mobile device. The mobile device may be a tablet computer such as an iPad®, a smartphone, a watch, or another mobile computing device with a screen and a processor.

The user can insert a first edge of the mobile device into a receiving section, which may be recessed. The user can then rotate the mobile device around its first edge to become flush with the body. A second edge of the mobile device that is opposite the first edge may then be brought into proximity with the second section of the body, which is opposite the first section. Once the second edge is close enough to the second section, magnets disposed within the mobile device and the body may become magnetically engaged, holding the mobile device flat within the body.

When the user wishes to extract the mobile device from the body, the user may be able to press one of the edges of the mobile device into a receiving section formed with a recessed area, causing the mobile device to tilt out of the body at a distal side and/or corner. The mobile device may be rotated such that the device may be grasped with the fingers of the user's hands.

By supporting the mobile device using a combination of magnetic attraction and physical support, and by permitting the user to eject the mobile device while pressing the mobile device 146, the system may provide advantages over conventional systems.

In some embodiments, the device may include a transition area that changes the amount of force needed to rotate the mobile device depending on the relative angle between the mobile device and the body.

A. First Embodiment and Variations

FIGS. 1, 2, 3, 4, and 5 illustrate features of a mobile device mounting system 102, according to a first embodiment and a variation of the first embodiment. As shown, a Z-axis represents a viewing axis (e.g., a third axis) while the X-axis and the Y-axis (e.g., a first axis and a second axis) represent axes corresponding to a length and width, respectively, of mobile device mounting system 102.

Figure 1:
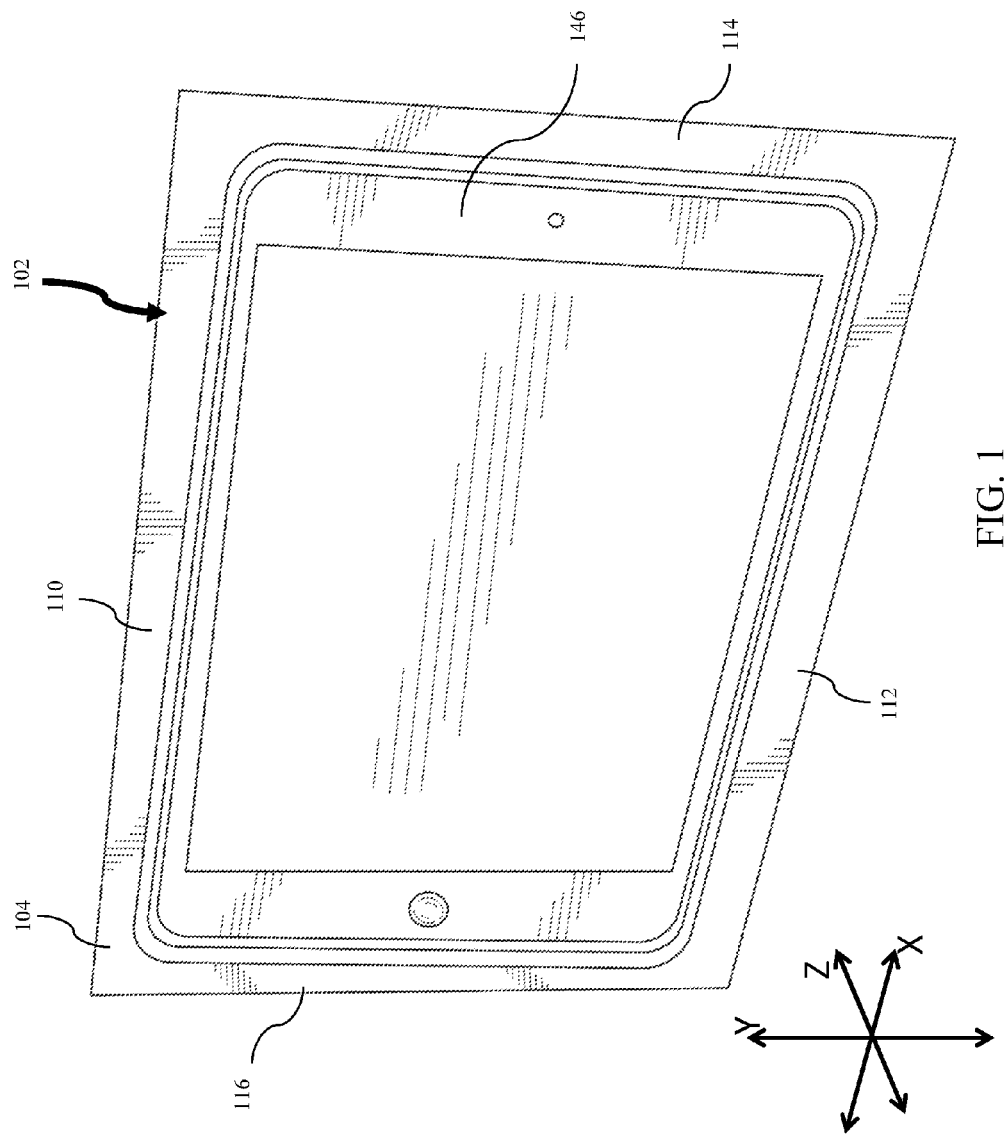
FIG. 1 is a front perspective view of a mobile device held by a mobile device mounting system, according to a first embodiment.
Figure 2:
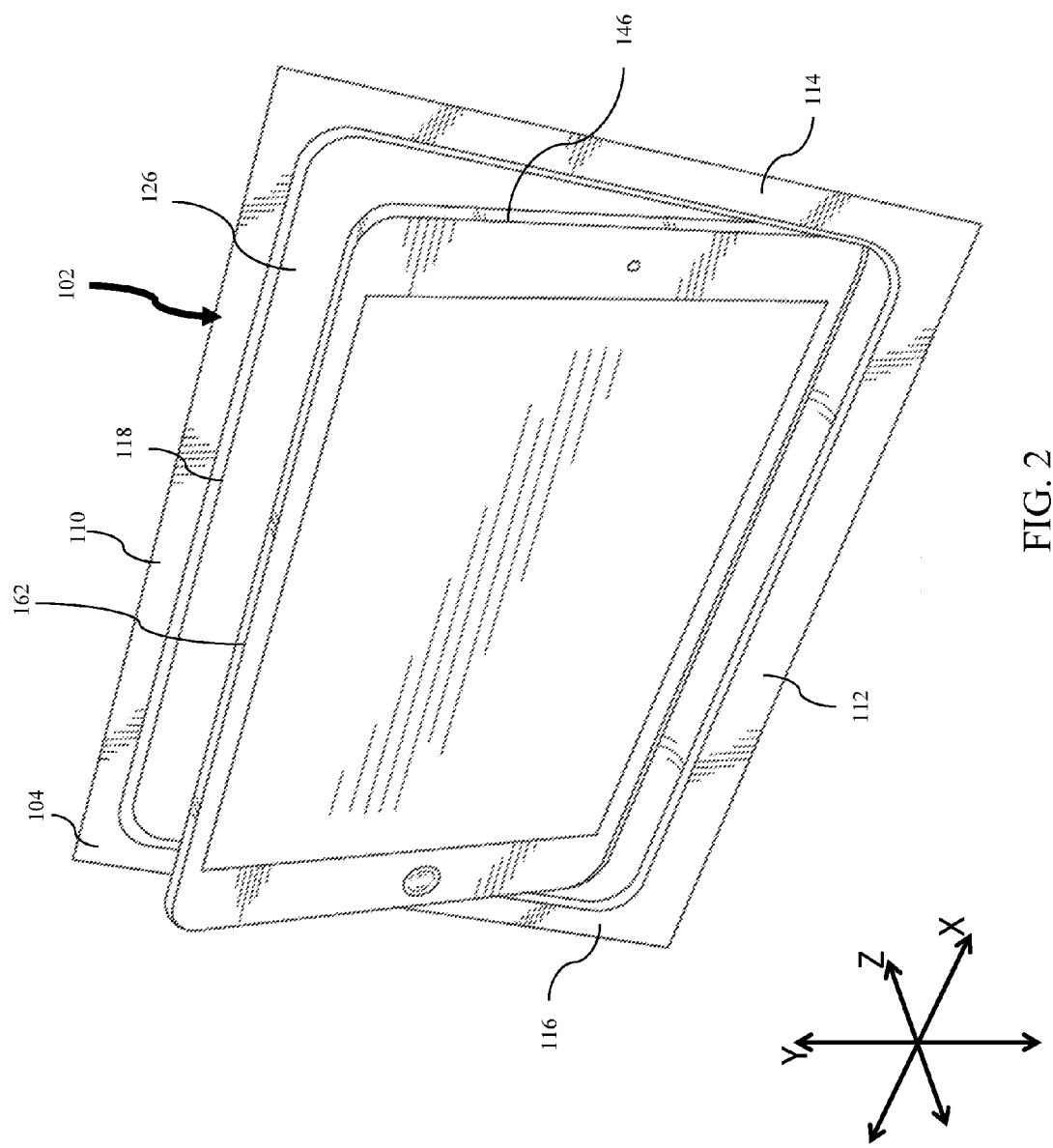
FIG. 2 is a front perspective view of the mobile device being angled out of the mobile device mounting system, according to the first embodiment.

FIGS. 1 and 2 illustrate a mobile device 146 being held within and being tilted (or rotated) out of the mobile device mounting system 102. In the embodiment of FIG. 1, the mobile device 146 can be held flush within the body of the mobile device mounting system 102, which includes a first end 110, a second 112, a third end 114, and a fourth end 116. Each end includes a flange that extends outward from the center of the mobile device mounting system 102. The flanges may be secured to a fixed object such as a car dash, the back of a seat or headrest, a wall, a refrigerator door, or another object where the mobile device mounting system 102 may be secured. The front side 104 of the mobile device mounting system 102 is oriented towards a user who wishes to view the mobile device 146.

As shown in FIG. 2, when the mobile device 146 has been angled outward from the mobile device mounting system 102, the mobile device 146 may be angled such that a magnetic edge 162 is separated from a magnetic support 118. When sufficiently separated, a user may easily grasp the edge of the mobile device 146 for removal. When the procedure is reversed, a user may insert the mobile device 146 into the mobile device mounting system 102 at the same or similar angles.

FIG. 3 includes a front perspective view of the mobile device mounting system 202, which is a variation of the mobile device mounting system 102. As shown, the mobile device mounting system 202 includes a front side 204, a first end 210, a second end 212, a third end 214, a fourth end 216, and a magnetic support cavity 252.

The magnetic support cavity 252 is formed within the first end 210. As shown, the magnetic support cavity 252 opens into a main cavity formed within the body of the mobile device mounting system 202 between the first end 210, the second end 212, the third end 214, and the fourth end 216. In other variations, permanent magnets may be installed in the magnetic support cavity 252, which may be covered or sealed during manufacture. In lieu of the magnet(s) and magnetic support or in addition thereto, the mounting system shown in the drawings has the recess sized in the X and Y directions to friction fit the electronic device or tablet device therein.

When the mobile device mounting system 202 is mounted in a car dash or a wall or other object, the magnetic support cavity 252 may be disposed at an upper location, lower location, or at a lateral side of a user's perspective. As shown, the first end 210 is longer than the third end 214 and the fourth end 216. The mobile device may also be mounted on a rod or the like.

Figure 4:
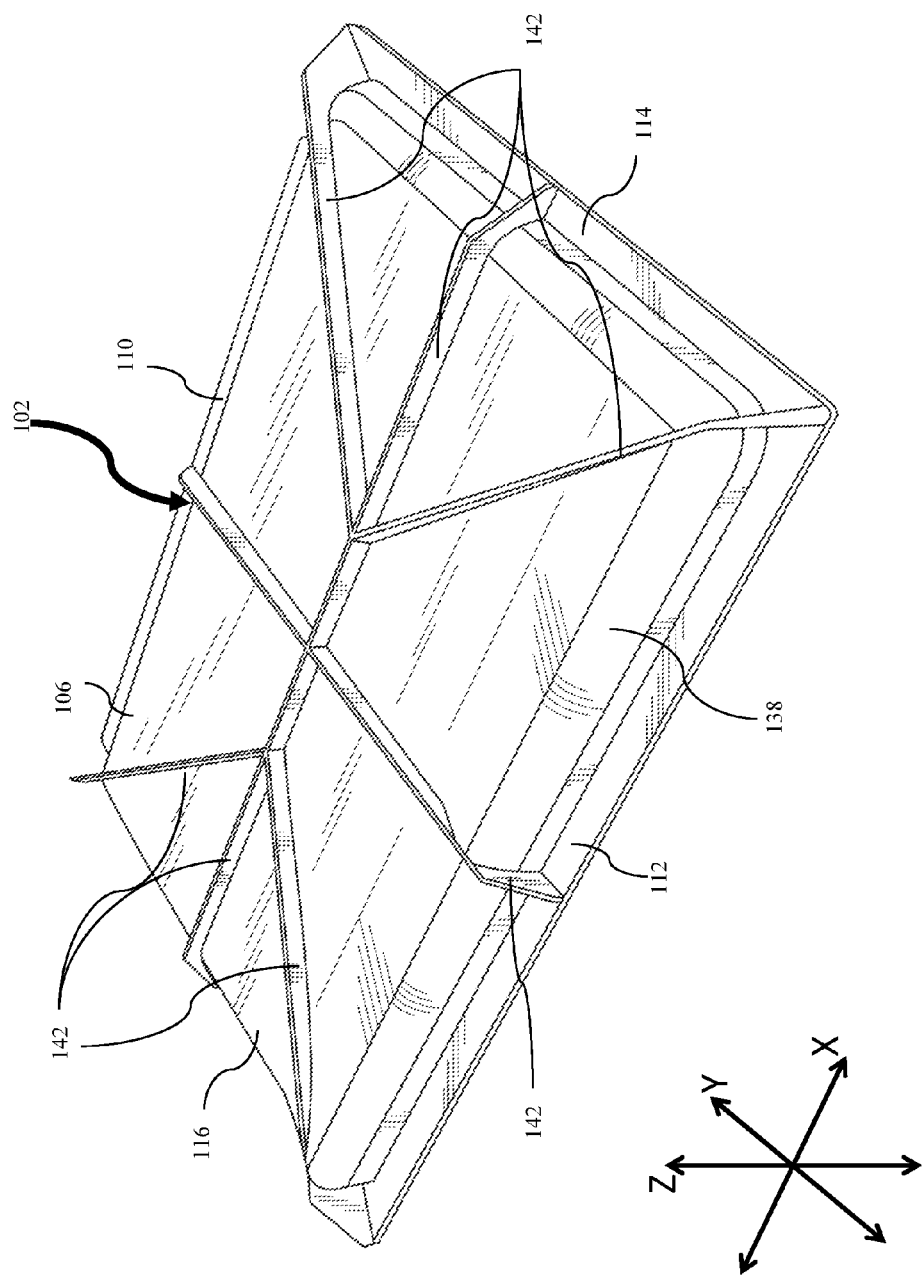
FIG. 4 is a rear perspective view of the mobile device mounting system, according to the first embodiment.

FIG. 4 includes a rear perspective view of the mobile device mounting system 102, illustrating the back side 106. Also shown are multiple support flanges 142. As shown, a support flange 142 extends between the first end 110 and the second end 112. An additional support flange 142 extends between the third end 114 and the fourth end 116. Support flanges 142 also extend diagonally from corners of the mobile device mounting system 102 to a central support flange 142 that extends between the third end 114 and the fourth end 116. The diagonally extending support flanges 142 intersect with the central support flange 142 before the support flange 142 extending between the first end 110 and the second end 112. The support flanges 142 extend within the plane formed by the X-axis and the Y-axis.

The support flanges 142 may provide benefits such as reduced weight and/or material cost while increasing product rigidity. For example, the support flanges 142 as configured may provide increased stiffness that reduces bending and flexing around the X and Y axes as well as bending around other axes within the XY plane defined by the X axis and the Y axis.

Figure 5:
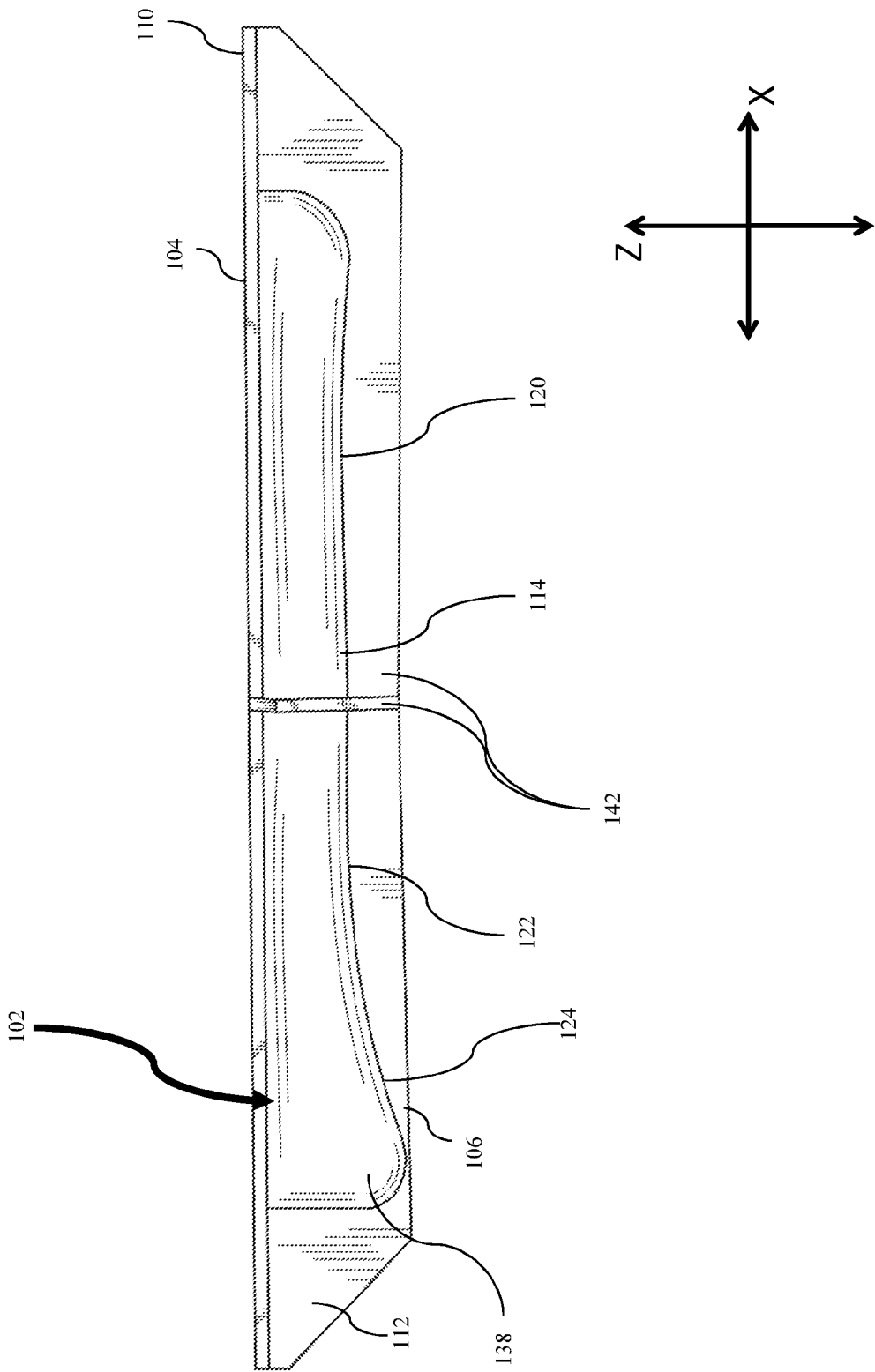
FIG. 5 is a side view of the mobile device mounting system, according to the first embodiment.

As shown in FIG. 5, which is a side view of the first embodiment, the rest support 120, the first rotation support 122, and the second rotation support 124 may have an exterior surface that form parts of the back side 106 of the mobile device mounting system 102.

The front side 104 may include surfaces from each of the first end 110, the second end 112, the third end 114, and the fourth end 116 (not shown). The front side 104 as shown is the front side of a frame that may be mounted in a car dash panel, a wall, or other object.

Also as shown in FIG. 5, the receiving section 138 is curved to expand along the Z-axis as distance along the X-axis from the first end 110 becomes greater. The expansion provides additional room and support for an inner curved surface that defines a recessed area.

B. Second Embodiment and Variations

Figure 6:
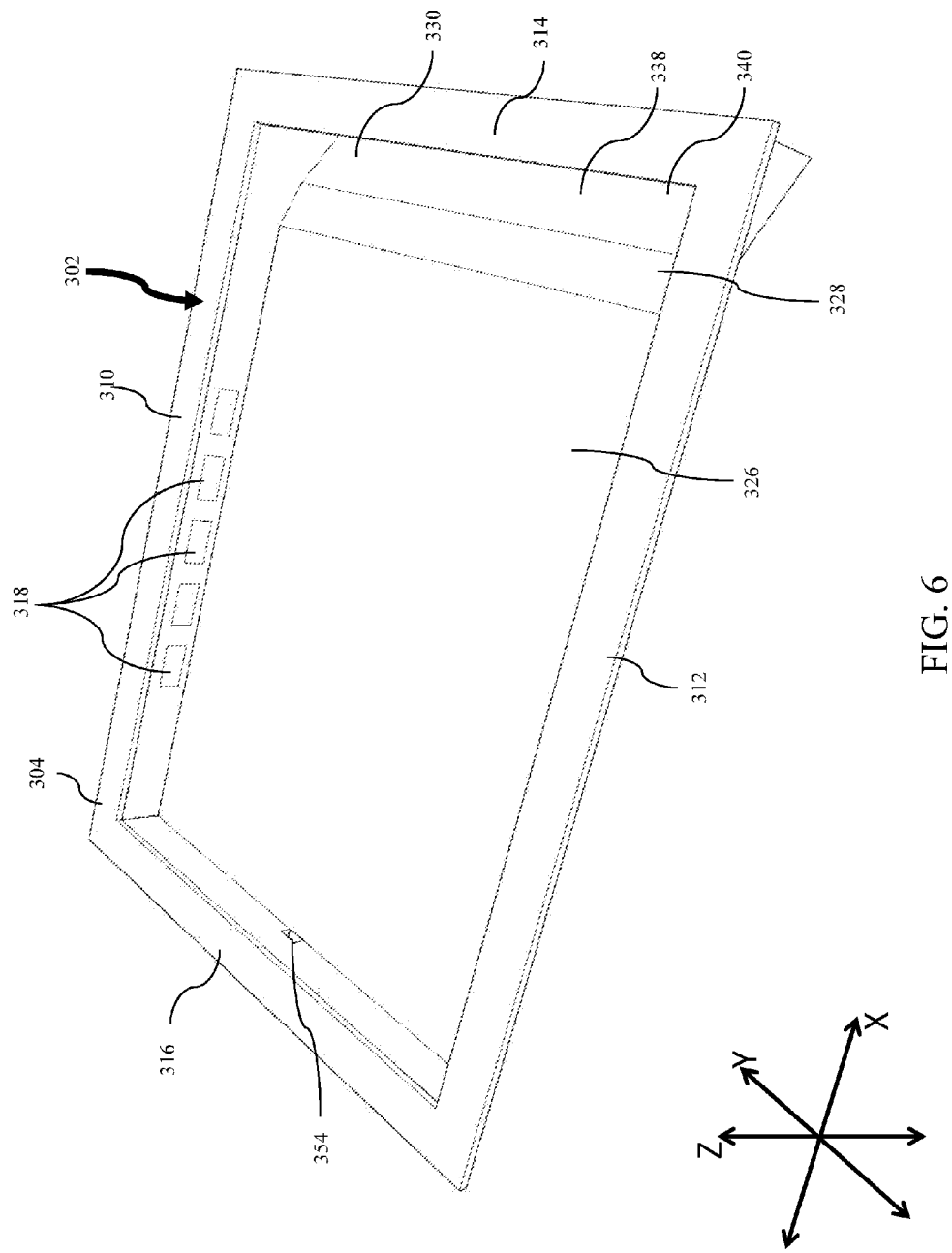
FIGS. 6 and 7 are perspective views of the mobile device mounting system, according to a second embodiment.
Figure 7:
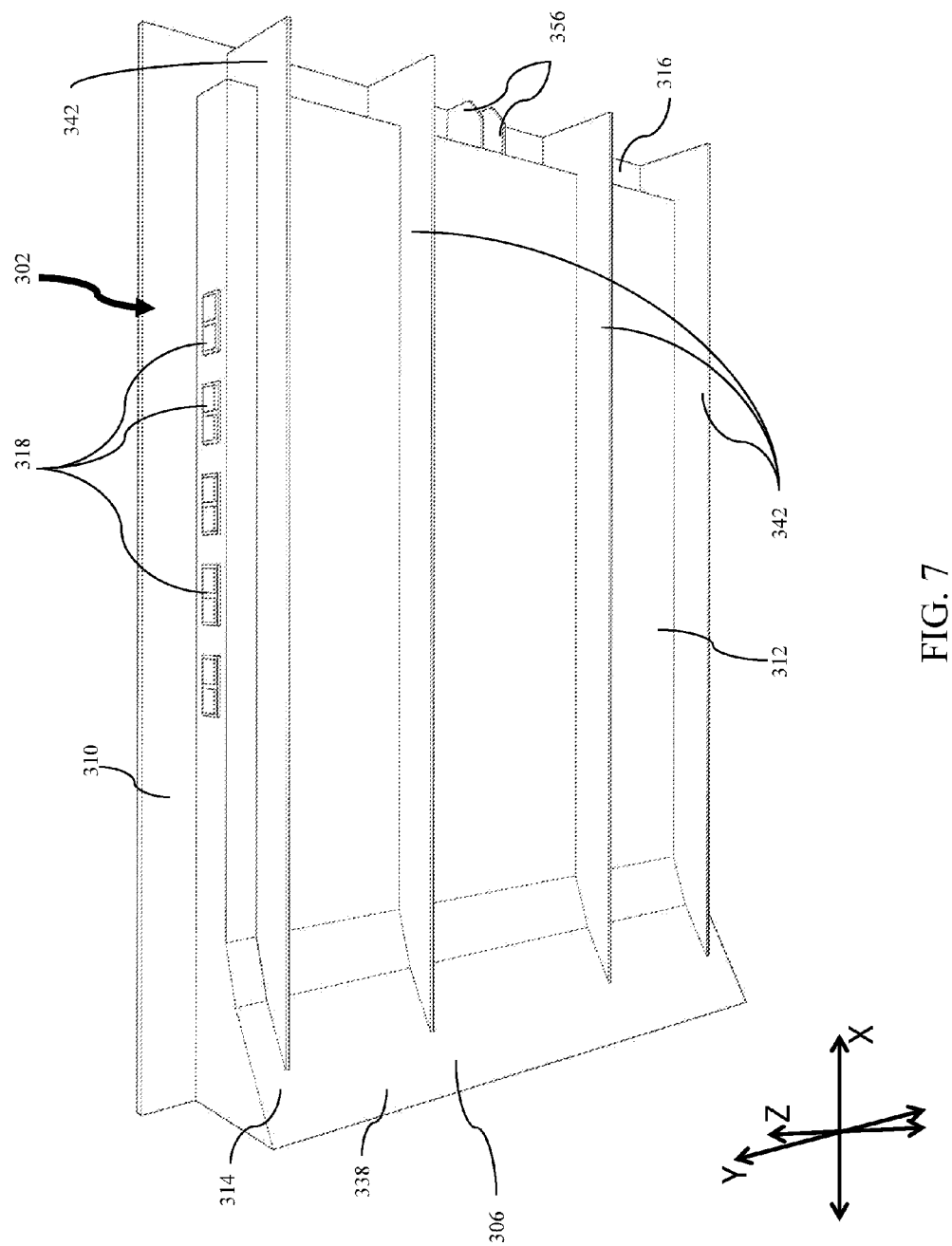

FIGS. 6 and 7 illustrate features of a mobile device mounting system 102, according to a second embodiment. As shown in FIG. 6, the receiving section 338 is disposed at a side that is adjacent to the first end 310 that includes the magnetic support 318. In this embodiment and its variations, the user may insert the mobile device (e.g. FIG. 1, mobile device 146) into a side adjacent to the magnetic support 318 rather than an opposite end. The second embodiment and its variations may be mounted with the magnetic support 318 at a top, bottom, or lateral edge.

When the mobile device mounting system 302 is mounted in a car dash and positioned with the magnetic support(s) 318 at a top edge, this may allow the user to more quickly and/or easily insert the mobile device 146 into the mobile device mounting system 302 for users who typically hold a mobile device from a lateral side.

The system of the second embodiment and its variations may allow greater magnetic attraction between the magnetic support 318 and a magnetic edge of a mobile device 146 over a wider range of angles. For example, while the distal portion of a mobile device's 146 magnetic edge 162 relative to the receiving section 338 may be too far from a magnetic support 318 to experience significant magnet attraction, the proximal portion of a mobile device's magnetic edge 162 may still be close enough to a magnetic support 318 to experience magnetic attraction.

As shown, the magnetic support 318 may be composed of a series of discrete magnets. In other embodiments, the magnetic support 318 may be formed from a single permanent magnet, or from one or more other types of magnets (e.g., electromagnets). The magnetic support 318 may be disposed at a top, bottom, or lateral side of the frame.

FIGS. 6 and 7 also include a port 354 and port flanges 356. In the illustrated embodiment, the port 354 and the port flanges 356 are disposed in the fourth end 316. The port 354 is an opening formed in a wall that extends in the YZ plane, which is perpendicular to the X axis. The port 354 is disposed at a center of the wall along the Y axis to permit a user to connect a cable to the mobile device 146, such as for data transmission or power supply to the mobile device 146.

The port flanges 356 extend along the X axis away from the third end 314 adjacent to the port 354. The port flanges 356 are parallel to each other and aligned with the XZ plane, which is perpendicular to the Y axis. The port flanges 356 provide support for a plug and/or cable.

C. Angles and Measurements

Figure 8:
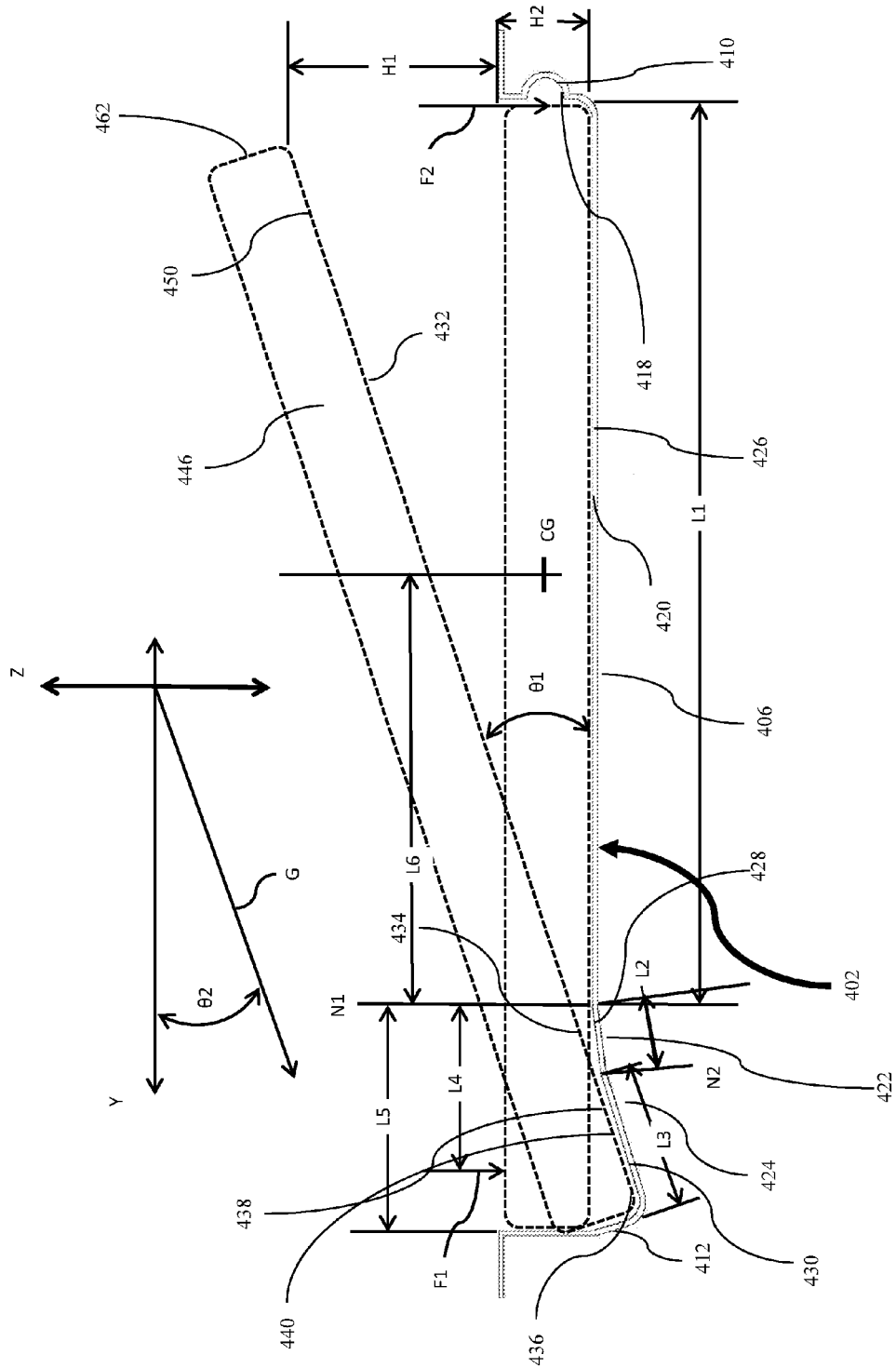
FIG. 8 is a schematic diagram of operation of a mobile device mounting system, according to various embodiments.

FIG. 8 illustrates some angles and measurements associated with various embodiments. As shown in FIG. 8, various embodiments of the mobile device mounting system 402 may hold a mobile device 446 at a lowered position with a magnetic edge 462 adjacent to a magnetic support 418, and at an elevated position with the magnetic edge 462 separated from the magnetic support 418. In operations involving the second embodiment and its variations, the mobile device mounting system 402 would also permit holding the mobile device 446 at elevated and lowered positions, but with different arrangements of the magnetic edge 462 and the magnetic support 418. When the mobile device mounting system 402 is mounted in an angled car dash panel, gravity (G) may be oriented at an angle $\theta 2$ relative to the Y axis.

At the lowered position, the first contact surface 432 of the mobile device 446 is in contact with the first support surface 426 of the rest support 420. The magnetic support 418 is adjacent to the magnetic support 418, and parts of the mobile device 446 are not in contact with the first rotation support 422 and the second rotation support 424.

When the user wishes to remove the mobile device 446 from the mobile device mounting system 402, the user may press on a front side (e.g., a screen side) of the mobile device 446 that is visible to the user. The user's pressing location may overlap with the first rotation support 422 or the second rotation support 424 when projected along the Z axis. In other embodiments, the pressing location may be at a location that is farther from the first end 410 than the first rotation support 422 or the second rotation support 424.

By pressing the surface of the mobile device 446, the user may cause the mobile device 446 to act as a lever that is rotated on a fulcrum. In various embodiments, one or more of the rest support 420, the first rotation support 422, and the second rotation support 424 may have curved surfaces that facilitate rotation of the mobile device 446.

The initial fulcrum (F1) may be located at a bordering edge between the first rotation support 422 and the rest support 420. As illustrated in FIG. 8, the distance from the fulcrum N1 to the end of the mobile device 446 having a magnetic edge 462 is L1 as measured along the Y axis. The length of the first rotation support 422 is L2, and the length of the third support surface 430 is L3. The distance from the distal edge of the mobile device 446 from the magnetic edge 462 to the fulcrum N1 is L5. The distance along the Y axis between the force F1 applied by a user and the fulcrum N1 is L4. The distance along the Y axis between the fulcrum N1 and the center of gravity (CG) of the mobile device 446 is L6.

The leverage that the user must apply to begin causing the mobile device 446 to be angled may need to be greater than the opposing leverage of the weight of the mobile device 446 and the opposing pull of the magnetic support 418. In the embodiment of FIG. 8, the magnetic support 418 is disposed at an opposite edge of the mobile device 446 relative to the fulcrum. In other embodiments, the magnetic support 418 may be disposed at a side of the mobile device mounting system 402 that is perpendicular to and adjacent to the fulcrum N1. The mass of the mobile device 446 may be M (e.g., kilograms mass). The acceleration due to gravity may be represented as G (e.g., 9.81 m/s^2).

The leverage applied by the user may be represented as F1*L4. The opposing leverage that the user's leverage should exceed may be represented as: $M*G*\sin(\theta2-\theta1)*L6+F2*L1$. Additional forces such as friction may also increase the amount of force that the user should exert to angle the mobile device 446 out of the mobile device mounting system 402 up to the elevated position.

As the angle θ1 increases, the location of the fulcrum may remain fixed or may be changed. For example, the second contact surface 434 and/or the third support surface 430 may be flat or curved.

As the user applies force F1, the mobile device 446 may be rotated around the fulcrum location F1 away from the first support surface 426 and towards the second contact surface 434. For embodiments in which the second support surface 426 is flat, the mobile device 446 may continue to be rotated around the fulcrum F1 until the mobile device 446 is parallel to the second contact surface 434. For embodiments that include a second rotation support 424 with a third support surface 430, the user may continue to apply force F1 such that the mobile device 446 continues to rotate. Further rotation may be around the fulcrum location N2. For rotation around N2, the leverage applied by the user may be represented as F1*(L4−L2), and the opposing leverage from the weight of the mobile device 446 and/or the magnetic support 418 may be represented as $M*G*\sin\theta2*(L6+L2)+F2*(L1+L2)$.

For embodiments in which the second support surface 428 and/or the third support surface 430 are curved, the location of the fulcrum may vary as the angle A1 changes. As the lever arm is shortened and θ1 increases, the user's applied torque for the same amount of force will decrease. At the same time, however, depending on the angle at which the mobile device mounting system 402 is mounted and the angle θ1 to which the mobile device 446 is rotated, the weight of the mobile device 446 may oppose or accelerate rotation of the mobile device 446 away from the mobile device mounting system 402. In addition, magnetic forces between the magnetic support 418 and the magnetic edge 462 may decrease rapidly with increasing distance along the Z axis. The change in position along the Z axis may be represented as H1+H2.

The recessed area 440 of the receiving section 438 may be defined in whole or in part by the second support surface 428 and the third support surface 430. The recessed area 440 may be configured to be sufficiently deep and/or angled relative to the first support surface 426 to cause the mobile device 446 to have a maximum angle such that a distance H1 is reached between an innermost side of the mobile device 446 and a front side of the mobile device mounting system 402. The distance H1 preferably is sufficient for a user to insert one or more fingers between the mobile device 446 and the mobile device mounting system 402. For example, in a preferred embodiment, H1 may be greater than 1 centimeter. In other embodiments, H1 may be 1 millimeter or more. Such smaller gaps may still permit removal of the mobile device 446 from the mobile device mounting system 402.

Figure 12:
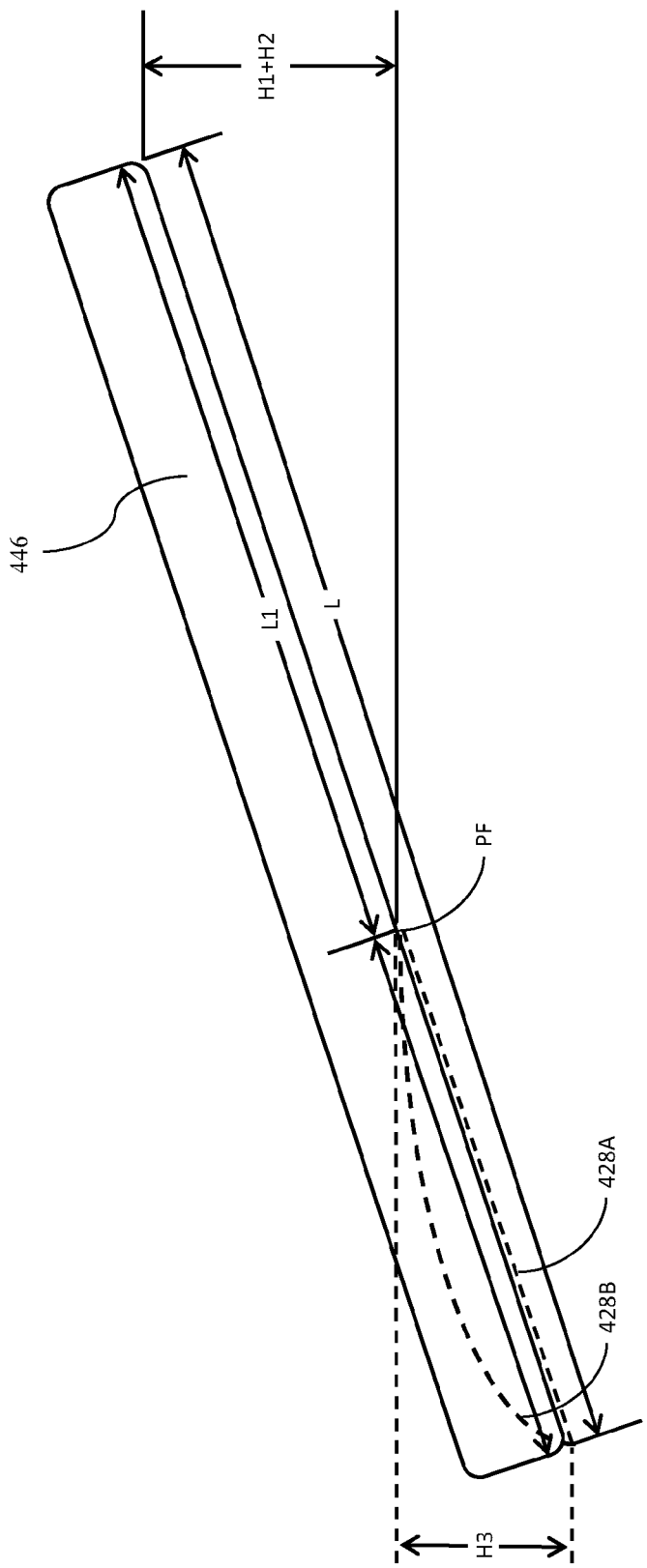
FIG. 12 is a schematic diagram from the side of the mobile device and recess of the device mounting system for further explaining operation of the mobile device mounting system.

In any event, the height above the side wall of the recess that the bottom of the mobile device must reach should preferably exceed the height of the side wall (H2) by a predetermined amount (PA) sufficient for the user to readily pry under or grip the exposed edge of the mobile device. Therefore, with reference to FIG. 12, he location of the pivot axis or fulcrum relative to the length (L) of the device along an axis normal to the pivot axis and the unrestricted depth to which the device may be pivoted about point PF must be such that: $H1+H2=L1\times(H3/L5)$, where H3 represents the minimum unrestricted depth to which the device must be able to rotate downward, L5 plus L1=L, H1≥PA. H2 is known (preferably equal to or close to the thickness H of the mobile device), and then H1 is known, leaving the selection of the pivot point to the designer, which then determines L1 and L5 since L is known, and so H3 may be determined once the pivot point is determined. Alternatively, the designer could select the depth H3 and then L1 or L5 may be determined. The second support surface 428A represents an angled surface. Alternatively, there may be multiple support surfaces as mentioned above, so a curved surface could form the second support surface 428B. In that case, the pivot point of the device continually moves.

D. Layout Variations

FIGS. 9A-9F illustrate possible layouts according to various embodiments. Some preferred embodiments include one or more first rotation supports that are recessed and/or angled relative to a rest support (e.g. 520A). Some embodiments also include one or more second rotation supports that are further recessed and/or angled relative to the first rotation supports (e.g. 522A.) The rest supports (e.g. 520A), the first rotation supports (e.g. 522A), and/or the second rotation supports (e.g. 524A) may have flat, angled, or curved surfaces.

FIG. 9A illustrates a variation in which a rest support 520A and a receiving section 538A are adjacent to each other, and each are adjacent to a first end 510A that has a magnetic support 518A. The receiving section 538A includes a first rotation support 522A and a second rotation support 524A. The first rotation support 522A is farther from the fourth end 516A than the rest support 520A. The second rotation support 524A is farther from the fourth end 516A than the first rotation support 522A. The second rotation support 524A is adjacent to the third end 514A.

This configuration permits a user to press at a side of a mobile device (e.g. FIG. 1 mobile device 146) that is near the third end 514A, causing the mobile device to rotate around an axis parallel to the Y axis and perpendicular to a side of the mobile device mounting system 502A that has the magnetic support 518A.

FIG. 9B illustrates a variation in which a first end 510B includes a magnetic support 518B. A rest support 520B is adjacent to the first end 510B, and a receiving section 538B is adjacent to the rest support 520B. The receiving section 538B and the rest support 520B are both adjacent to the third end 514B and the fourth end 516B. The receiving section 538B includes a first rotation support 522B and a second rotation support 524B. The second rotation support 524B is farther from the first end 510B than the first rotation support 522B.

This configuration permits a user to press at a side of a mobile device (e.g. FIG. 1 mobile device 146) that is near the second end 512B, causing the mobile device to rotate around an axis parallel to the X axis and parallel to a side of the mobile device mounting system 502B that has the magnetic support 518B.

FIG. 9C illustrates a variation in which a rest support 520C is disposed between a pair of first rotation supports 522C. Both of the first rotation supports 522C and the rest support 520C are disposed between a first end 510C and a second end 512C. The first end 510C includes a magnetic support 518C. One of the first rotation supports 522C is adjacent to the fourth end 516C, and the other first rotation support 522C is adjacent to the third end 514C.

This configuration permits a user to press at a side of a mobile device (e.g. FIG. 1 mobile device 146) that is near the third end 514C or the fourth end 516C, causing the mobile device to rotate around an axis parallel to the Y axis and perpendicular to a side of the mobile device mounting system 502C that has the magnetic support 518C.

FIG. 9D illustrates a variation that includes two merged receiving sections 538D. One of the receiving sections 538D is disposed farther from the magnetic support 118D than the rest support 520D along the Y axis. The other receiving section 538D is disposed farther from the fourth end 516D than the rest support 520D.

This configuration permits a user to press at a side of a mobile device (e.g. FIG. 1 mobile device 146) that is near the third end 514D, causing the mobile device to rotate around an axis parallel to the Y axis and perpendicular to a side of the mobile device mounting system 502D that has the magnetic support 518D.

This configuration also permits a user to press at a side of a mobile device that is near the second end 512D, causing the mobile device to rotate around an axis parallel to the X axis and parallel to a side of the mobile device mounting system 502D that has the magnetic support 518D.

FIG. 9E illustrates a variation that includes a receiving section 538E that follows the perimeter of the mobile device mounting system 502E. The rest support 520E occupies a middle area, and is bordered on each side by the receiving section 538E. A user is thus enabled to press the mobile device (e.g. FIG. 1 mobile device 146) at any edge to cause the mobile device to be angled outward from the mobile device mounting system 502E.

In other words, the user may press a side of the mobile device at an area that is not directly supported by the rest support 520E. These areas may be between the rest support 520E and one of the first end 510E, the second end 512E, the third end 514E, and the fourth end 516E. Pressing near one side of the mobile device with sufficient force causes the opposite side and/or corner to be elevated. For example, pressing near the third end 514E elevates the side of the mobile device near the fourth end 516E. Pressing near the fourth end 516E elevates the side of the mobile device near the third end 514E.

Pressing the mobile device (e.g. FIG. 1 mobile device 146) at a corner may raise the opposite mobile device corner and/or an edge distal to the corner being pressed. For example, pressing a corner of the mobile device at the corner of the first end 510E and the third end 514E may raise the corner of the mobile device located near the corner of the second end 512E and the fourth end 516E. The edge of the mobile device near the second end 512E and/or the edge of the mobile device near the fourth end 516E may also be elevated, depending on which corner of the mobile device is pressed.

FIG. 9F illustrates a variation that includes a receiving section 538F that borders the rest support 520F on three sides. In the embodiment as shown, the rest support 520F is adjacent to the first end 510F, which includes the magnetic support 518F. The receiving section 538F is between the rest support 520F and each of the second end 512F, the third end 514F, and the fourth end 516F.

When a user presses with sufficient force on a surface of the mobile device (e.g. FIG. 1 mobile device 146) that is suspended above a part of the receiving section 538F, the mobile device is rotated into the receiving section 538F, which causes one or more distal edges and/or corners to be elevated.

The rotation of the mobile device may depend on the surface that it is being rotated around. For example, in the image as shown, the rest support 520F has flat sides that cause the mobile device to be rotated parallel to one of the X axis or the Y axis. In other embodiments, angled or rounded surfaces of the rest support 520F and/or the receiving section 538F may enable rotation of the mobile device in other directions. For example, the rest support 520F in other embodiments may include an angle edge that is angled at 45 degrees relative to the second end 512F and the third end 514F. The angled edge may permit a user to press the mobile device face above the corner of the receiving section 538F between the third end 514F and the second end 512F to elevate the opposite corner of the mobile device.

E. Receiving Section and Supporting Section Variations

FIGS. 10A-10F illustrate cross-sectional views of different receiving sections (e.g. 638A) and supporting sections, according to various embodiments.

FIG. 10A illustrates an embodiment of a mobile device mounting system 602A with components that may be integrally formed or assembled from separate components. The embodiment includes a first end 610A having a first mount extension 658A, and a second end 612A having a second mount extension 660A. The first and second mount extensions (658A, 660A) may form a framing border that is secured to a mounting surface such as a vehicle dashboard. As illustrated, the second end 612A further includes a retaining flange 644A.

The mobile device mounting system 602A further includes a magnetic support 618A, a rest support 620A, a first rotation support 622A, a first support surface 626A, a second support surface 628A, and a receiving section 638A having a recessed area 640A. The mobile device mounting system 602A lacks a second rotation support (e.g. such as second rotation support 624D in FIG. 10D).

A user may insert a mobile device 146 into the recessed area 640A of the mobile device mounting system 602A, and can then rotate the mobile device 146 until it is adjacent to the magnetic support 618A. To resist outward movement of the end of the mobile device 146 that is distal to the magnetic support 618A, the retaining flange 644A may extend inward along the X axis from the second end 612A toward the first end 610A. In some preferred embodiments, the retaining flange 644A may extend between 0.5 mm to 3 mm inward from an inner wall of the receiving section 638A. The inner wall may be parallel to a plane that is defined by the X axis.

The recessed area 640A of the receiving section 638A is defined in part by the second support surface 628A. In the embodiment as shown, the second support surface 628A and the first support surface 626A are parallel to the X axis. The edge of the first support surface 626A acts as a fulcrum for rotation of the mobile device 146. When the user presses on the mobile device 146 on a part of the mobile device that would overlap with the second support surface 628A, the mobile device 146 is rotated around the fulcrum.

In FIG. 10B, an alternate variation is shown that differs from the variation of FIG. 10A by the form and positioning of the rest support 620B and the second support surface 628B, as well as the form of the recessed area 640B. In FIG. 10B, part of the rest support 620B extends away from the magnetic support 618B along the X axis, and extends over a part of the second support surface 628B.

Figure 10C:
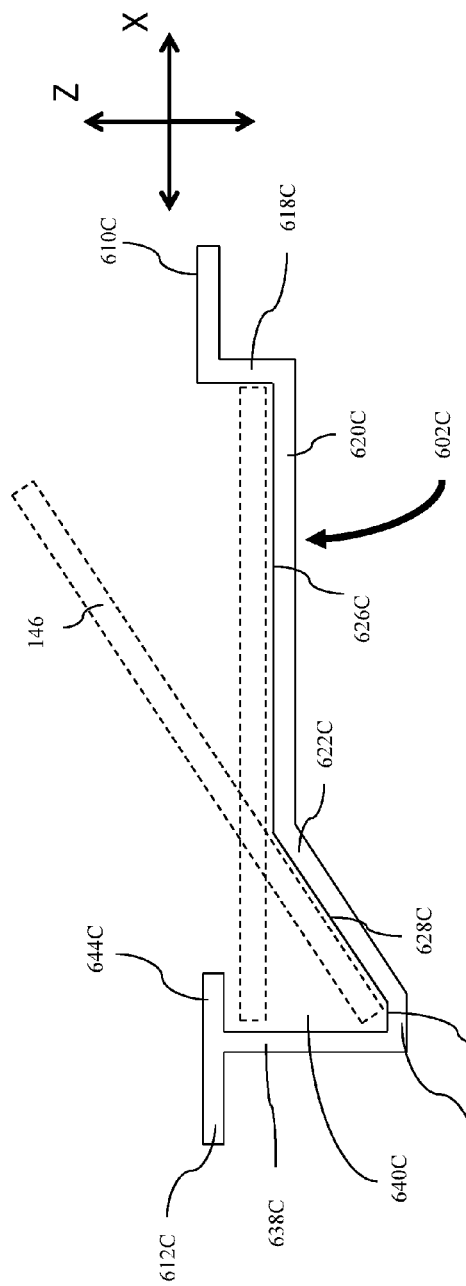

FIG. 10C illustrates a variation of the mobile device mounting system 602C that includes a first rotation support 622C that has a second support surface 628C that is angled relative to the first support surface 626C of the rest support 620C. The mobile device mounting system 602C also includes a second rotation support 624C that has a third support surface 630C that is parallel to the first support surface 626C and is defined by the Z axis.

The first support surface 626C, the second support surface 628C, and the third support surface 630C form a continuous surface. The first support surface 626C, the second support surface 628C, and the third support surface 630C are flat.

Figure 10D:
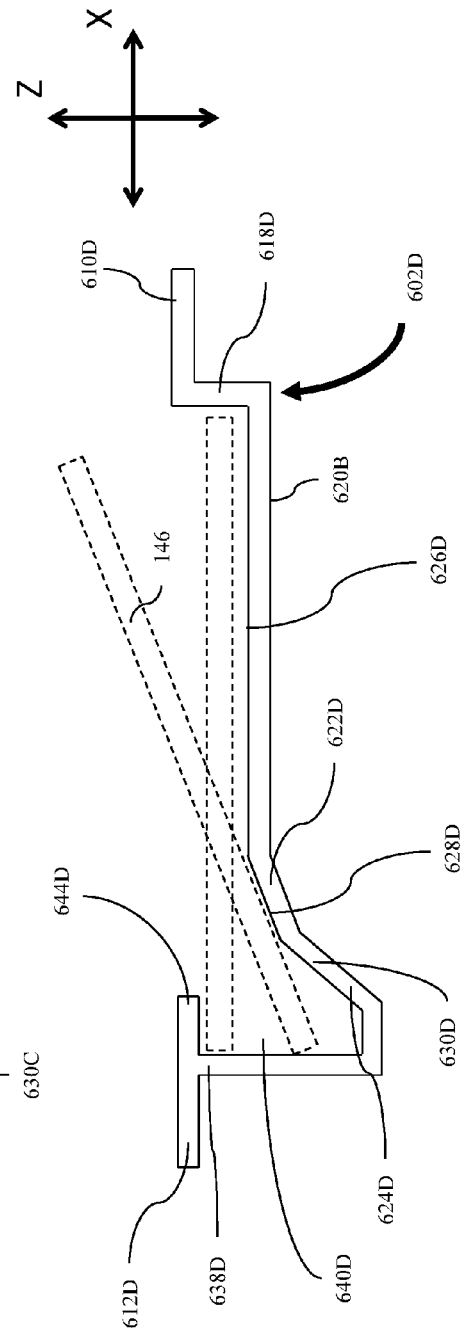

FIG. 10D illustrates a variation in which the second support surface 628D is angled with respect to the first support surface 626D, and the third support surface 630D is angled with respect to both the first support surface 626D and the second support surface 628D.

The first support surface 626D, the second support surface 628D, and the third support surface 630D are each flat and together form a continuous surface. The second support surface 628D is angled to permit the mobile device 146 to simultaneously rotate away from the first support surface 626D, towards the second support surface 628D, and towards being parallel with the second support surface 628D.

Figure 10E:
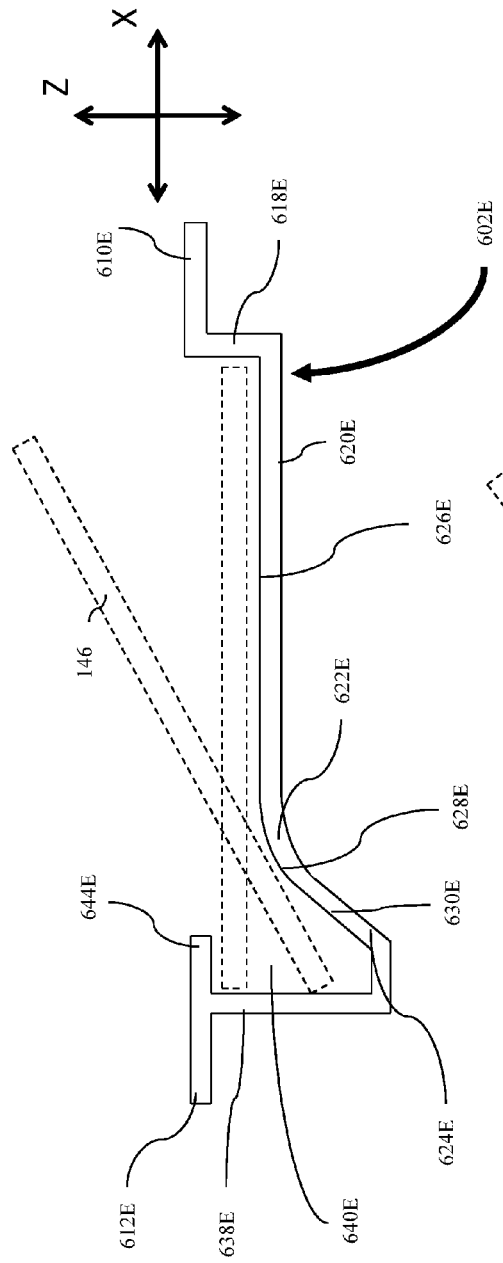

FIG. 10E illustrates a variation in which the second support surface 628E is curved. As the mobile device 146 is rotated from a lowered position to an elevated/angled position, the fulcrum location is varied. The fulcrum location may vary between the closest edge and the farthest edge of the second support surface 628E relative to the magnetic support 618E.

Figure 10F:
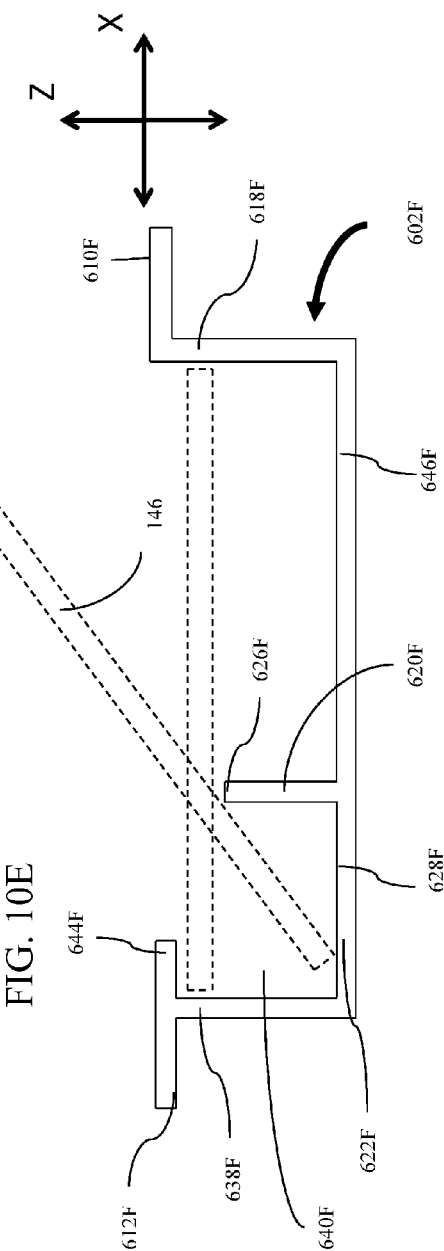

FIG. 10F illustrates a variation in which the rest support 620F extends upward along the Z axis. The rest support 620F may be a rod, a wall, or composed of a plurality of elongate members or walls. The first support surface 626F is the upper surface of the rest support 620F.

The first rotation support 622F may extend from the base of the rest support 620F along the X axis away from the magnetic support 618F.

In some embodiments, the mobile device 146 may be capable of being rotated toward or away from the second support surface 628F from a lowered position (e.g., a rest position or a held position). For example, if the retaining flange 644F is smaller or is not present, the user may press the mobile device 146 at a location near the magnetic support 618F at an area that would rotate the mobile device 146 upward or away from the second support surface 628F.

The third support surface 630D is angled to permit the mobile device 146 to continue rotating away from the first support surface 626D and the second support surface 628D, and towards the third support surface 630D as well as towards being parallel with the third support surface 630D.

F. Exemplary Method

Figure 11:
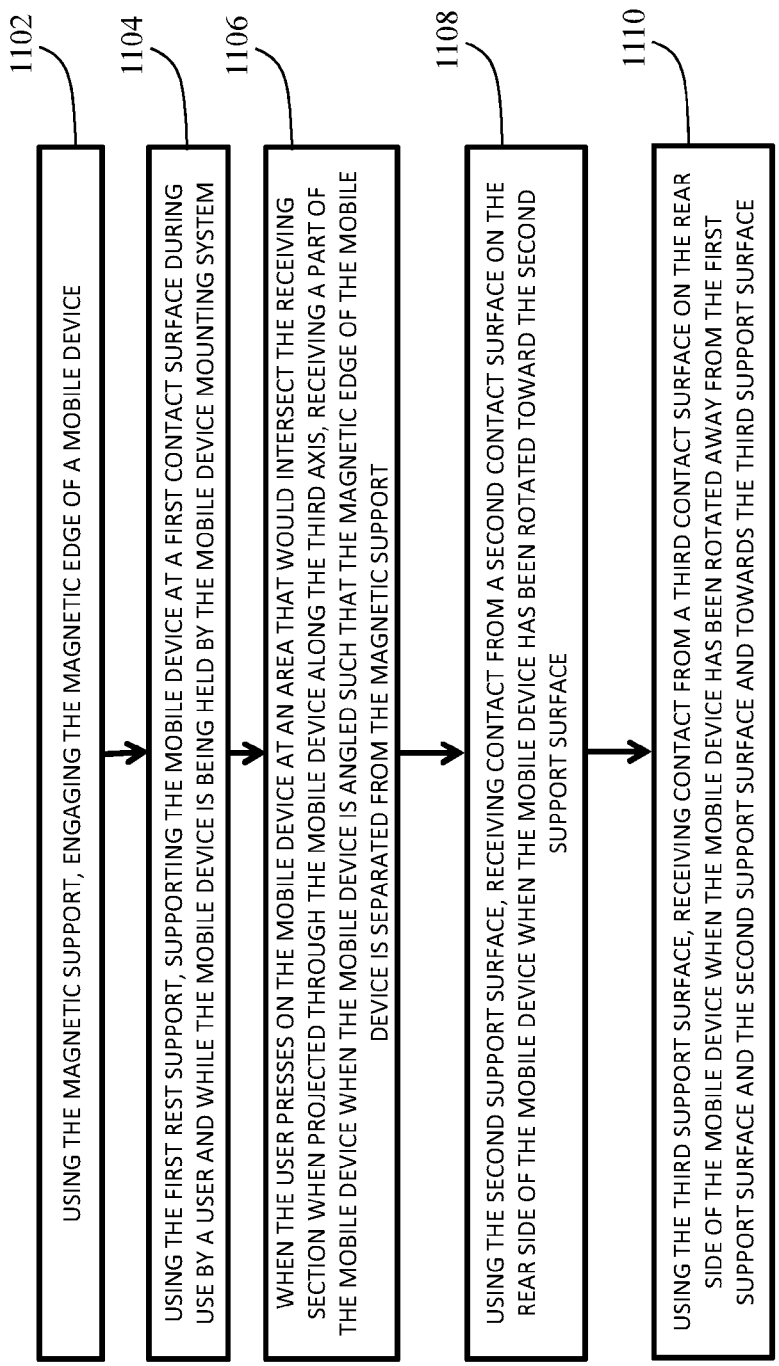
FIG. 11 is a flowchart of operations of a mobile device mounting system, according to an embodiment.

FIG. 11 illustrates a flowchart of an exemplary method. In some embodiments, each of the operations are performed. In other embodiments, one or more of the operations are optional and/or may be performed in a different sequence.

In operation 1102, using the magnetic support, the system engages the magnetic edge of a mobile device.

In operation 1104, using the first rest support, the system supports the mobile device at a first contact surface during use by a user and while the mobile device is being held by the mobile device mounting system.

In operation 1106, when the user presses on the mobile device at an area that would intersect the receiving section when projected through the mobile device along the third axis, the system receives a part of the mobile device when the mobile device is angled such that the magnetic edge of the mobile device is separated from the magnetic support.

In operation 1108, using the second support surface, the system receives contact from a second contact surface on the rear side of the mobile device when the mobile device has been rotated toward the second support surface.

In operation 1110, using the third support surface, the system receives contact from a third contact surface on the rear side of the mobile device when the mobile device has been rotated away from the first support surface and the second support surface and towards the third support surface.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

In addition, although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A mobile device mounting system configured to hold a mobile device having a magnetic edge, the mobile device mounting system comprising:

a rest support that extends in a first direction and a second direction normal to the first direction and is mechanically coupled to the magnetic support, the rest support having a rectangular profile defined between first and third parallel ends and second and fourth parallel ends and having a first support surface that contacts a first contact surface on a rear side of the mobile device when the mobile device is moved downward in a third direction that is perpendicular to the first direction and the second direction to be held by the mobile device mounting system for viewing, and the mobile device's magnetic edge is adjacent to and magnetically engaged with the magnetic support; and a receiving section that is mechanically coupled to the rest support, the receiving section defining a recessed area relative to the first support surface along the third direction, the recessed area extending from one opposing end of the first through the fourth end to the other opposing end of the first through the fourth end, and being configured to receive a part of the mobile device when the mobile device is angled such that the magnetic edge of the mobile device is separated from the magnetic support.

2. The mobile device mounting system of claim 1, wherein the receiving section includes a first rotation support that has a second support surface that contacts a second contact surface on the rear side of the mobile device when the mobile device has been rotated toward the second support surface.

3. The mobile device mounting system of claim 2, wherein the second support surface is curved such that a part of the second contact surface that is in contact with the second support surface changes as the mobile device is rotated around the first rotation support.

4. The mobile device mounting system of claim 3, wherein the curve of the second support surface decreases in radius with increasing distance away from the first support surface.

5. The mobile device mounting system of claim 2, wherein the receiving section includes a second rotation support that is mechanically coupled to the first rotation support, the second rotation support having a third support surface that contacts a third contact surface on the rear side of the mobile device when the mobile device has been rotated away from the first support surface and the second support surface and towards the third support surface.

6. The mobile device mounting system of claim 1, further comprising:

a magnetic support that extends along the first direction.

* * * * *